United States Patent
Melendez et al.

(10) Patent No.: US 11,299,285 B2
(45) Date of Patent: Apr. 12, 2022

(54) SYSTEMS AND METHODS FOR PROVIDING THROTTLE GUIDANCE AS A FUNCTION OF FLIGHT PATH ACCELERATION

(71) Applicant: HONEYWELL INTERNATIONAL INC., Morris Plains, NJ (US)

(72) Inventors: Luis Melendez, Scottsdale, AZ (US); Philip Sin, Phoenix, AZ (US); John Koenig, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 227 days.

(21) Appl. No.: 16/672,105

(22) Filed: Nov. 1, 2019

(65) Prior Publication Data
US 2020/0198796 A1 Jun. 25, 2020

Related U.S. Application Data (60) Provisional application No. 62/782,841, filed on Dec. 20, 2018.

(51) Int. Cl.
*B64D 31/06* (2006.01)
*B64F 5/60* (2017.01)

(52) U.S. Cl.
CPC .............. *B64D 31/06* (2013.01); *B64F 5/60* (2017.01)

(58) Field of Classification Search
CPC .......... B64D 31/06; B64F 5/60; G05D 1/0607
See application file for complete search history.

(56) References Cited

U.S. PATENT DOCUMENTS

| | | |
|---|---|---|
| 3,691,356 A | 9/1972 | Miller |
| 4,205,814 A | 6/1980 | Larson et al. |
| 4,277,041 A | 7/1981 | Marrs et al. |
| 4,422,147 A | 12/1983 | Hanke |
| 4,490,793 A | 12/1984 | Miller |
| 4,534,000 A | 8/1985 | Bliss |
| 4,569,021 A | 2/1986 | Larson et al. |
| 4,589,616 A | 5/1986 | Zweifel |
| 4,811,230 A * | 3/1989 | Graham ............... G05D 1/0061 701/15 |
| 4,912,642 A | 3/1990 | Larsen et al. |
| 5,000,404 A | 3/1991 | Martorella |
| 5,079,711 A | 1/1992 | Lambregts et al. |
| 5,188,316 A | 2/1993 | Dressier et al. |

(Continued)

FOREIGN PATENT DOCUMENTS

| | | |
|---|---|---|
| EP | 0482250 A1 | 4/1992 |
| WO | 2011078847 A1 | 6/2011 |
| WO | 2018224565 A2 | 12/2018 |

*Primary Examiner* — Mussa A Shaawat
(74) *Attorney, Agent, or Firm* — Lorenz & Kopf, LLP (57) ABSTRACT

Technologically improved vehicle control systems and methods are described. The provided vehicle control systems and methods embody an inner loop auto-throttle control for causing delta-throttle changes, i.e., servo changes, to achieve desired acceleration targets. The system generates an error on a potential flight path angle using a received thrust acceleration command. The error on the potential flight path angle is converted into an equivalent acceleration. A throttle rate command $TLA\_rate_{cmd}$ is generated by converting the equivalent acceleration into the throttle rate command $TLA\_rate_{cmd}$.

17 Claims, 4 Drawing Sheets

(56) References Cited

U.S. PATENT DOCUMENTS

| | | | |
|---|---|---|---|
| 5,349,532 A | 9/1994 | Tilley et al. | |
| 5,502,364 A | 3/1996 | Blechen et al. | |
| 5,746,392 A * | 5/1998 | Gast | B64C 13/503 |
| | | | 244/76 B |
| 5,833,177 A * | 11/1998 | Gast | G05D 1/0816 |
| | | | 244/195 |
| 6,186,447 B1 * | 2/2001 | Virdee | B64D 31/08 |
| | | | 244/188 |
| 6,507,782 B1 * | 1/2003 | Rumbo | G05D 1/0005 |
| | | | 244/182 |
| 6,963,795 B2 * | 11/2005 | Haissig | G08G 5/0008 |
| | | | 342/104 |
| 8,024,080 B2 | 9/2011 | Greene | |
| 8,311,687 B2 | 11/2012 | Bakker | |
| 8,761,966 B2 | 6/2014 | Zhu et al. | |
| 9,061,756 B2 * | 6/2015 | Jang | G05B 23/0286 |
| 9,224,302 B1 | 12/2015 | Young et al. | |
| 9,346,552 B2 * | 5/2016 | Greene | G05D 1/0055 |
| 9,481,472 B2 | 11/2016 | Moune et al. | |
| 10,175,698 B1 * | 1/2019 | Wyatt | G05D 1/0607 |
| 10,793,286 B1 * | 10/2020 | Carrico | G06T 7/33 |
| 2003/0058134 A1 * | 3/2003 | Sherry | G05D 1/0607 |
| | | | 340/945 |
| 2008/0228333 A1 * | 9/2008 | De Menorval | G08G 5/0052 |
| | | | 701/14 |
| 2013/0060466 A1 * | 3/2013 | Gurusamy | G01C 23/005 |
| | | | 701/465 |
| 2014/0358415 A1 * | 12/2014 | McDonald | G08G 5/025 |
| | | | 701/120 |
| 2020/0183424 A1 * | 6/2020 | Li | G01P 21/025 |
| 2021/0141394 A1 * | 5/2021 | Melendez | B64D 31/08 |

\* cited by examiner

SYSTEMS AND METHODS FOR PROVIDING THROTTLE GUIDANCE AS A FUNCTION OF FLIGHT PATH ACCELERATION

CROSS-REFERENCE TO RELATED APPLICATION

This application claims the benefit of U.S. Provisional Application No. 62/782,841, filed Dec. 20, 2018.

TECHNICAL FIELD

The present invention generally relates to vehicle control systems, and more particularly relates to vehicle control systems and methods that provide throttle rate control as a function of a desired flight path acceleration.

BACKGROUND

An automatic flight control system provides guidance and control of an aircraft by generating guidance commands that are displayed to the pilot under manual flight or sent to an autopilot and/or auto-throttle function when automatic flight is selected. Confidence on the flight control system guidance is impacted by several factors, primarily the ability of the pilot to visually evaluate the guidance in terms of whether (1) the guidance is in accordance with the desired pilot-selected targets and (2) whether the guidance results in a similar maneuver to the one that the pilot would perform without guidance.

For control of the aircraft on a vertical and a lateral axis, the guidance is generally provided by an autoflight or flight director function and is generally presented on the Primary Flight Display (PFD) as flight path angle (FPA) commands on the vertical axis and as roll angle commands on the lateral axis. The FPA and roll angle commands provide an intuitive indication as to whether the guidance is requesting the aircraft to climb or descend on the vertical axis and whether the aircraft is being requested to turn left or right to follow a desired lateral trajectory.

With regard to control of the aircraft on a thrust axis, the guidance is generally provided by an auto-thrust or thrust director function. Many available auto-thrust systems consist of a speed control law and a thrust control law that generate engine power commands in the units of control of the selected engine. A determination may be made as to which control law to use, based on the phase of flight and the autoflight's mode of operation. Guidance cues for auto-thrust functions are commonly a representation of a target point on an engine dial, the target point representing the desired engine power determined by the auto-thrust, or a throttle level error on the PFD. However, neither the throttle level error indication or the engine dial indication provides an intuitive indication of whether the aircraft is accelerating or decelerating. Additionally, instead of generating engine power commands in the units of control of the selected engine, many pilots prefer to control speed of the aircraft by using the flight path acceleration indicator on the PFD to regulate the aircraft's acceleration in order to achieve a target speed. This presents a technical problem because the auto-throttle function would need to be adjusted to translate these acceleration commands into the appropriate engine power settings via throttle commands to achieve the desired acceleration from the auto-thrust or thrust director function.

Therefore, improved systems and methods for providing throttle rate control that achieve the desired acceleration targets and can provide an intuitive indication to the pilot in the thrust axis are desired. Furthermore, other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a processor-implemented method for providing throttle rate control. The method includes: receiving aircraft constraints; receiving a thrust acceleration command; receiving a throttle level angle (TLA), which is a real time (RT) throttle setting; receiving a RT thrust (T) setting; generating an error on a potential flight path angle using the thrust acceleration command; converting the error on the potential flight path angle into an equivalent acceleration; and generating a throttle rate command $TLA\_rate_{cmd}$ by converting the equivalent acceleration into the throttle rate command $TLA\_rate_{cmd}$.

A system for providing throttle rate control is provided, including: a source of aircraft state data; a source of aircraft constraints; a source of a thrust acceleration command; a source of a real time (RT) throttle level angle (TLA) that is a throttle setting; a source of a RT thrust (T) setting; a processor operationally coupled to the source of aircraft constraints, the source of a thrust acceleration command, the source of a RT TLA, and the source of a RT T, the processor programmed to: generate an error on a potential flight path angle using the thrust acceleration command; convert the error on the potential flight path angle into an equivalent acceleration; and generate a throttle rate command $TLA\_rate_{cmd}$ by converting the equivalent acceleration into the throttle rate command $TLA\_rate_{cmd}$.

In an embodiment, an aircraft is provided, including: a source of aircraft state data; a source of aircraft constraints; a source of a thrust acceleration command; a source of a real time (RT) throttle level angle (TLA); a source of a RT thrust (T) setting; a processor operationally coupled to the source of aircraft constraints, the source of a thrust acceleration command, the source of a RT TLA, and the source of a RT T, the processor programmed to: generate an error on a potential flight path angle using the thrust acceleration command; convert the error on the potential flight path angle into an equivalent acceleration; and generate a throttle rate command $TLA\_rate_{cmd}$ by converting the equivalent acceleration into the throttle rate command $TLA\_rate_{cmd}$.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any theory presented in the preceding background or the following detailed description.

The provided exemplary embodiments of a throttle rate control module (FIG. 1, 104, also referred to below as an auto-throttle throttle rate control module, or simply control module 104) employ a novel auto-throttle inner loop control law embodied in an algorithm (FIG. 1: program 162 plus stored variables 164), to thereby deliver an enhanced flight guidance system that generates the desired throttle rate control. The novel auto-throttle inner loop control algorithm generates delta-throttle commands using a flight path acceleration (FIG. 2, 203) as the control parameter.

The throttle rate control module 104 provides improved performance over available thrust guidance systems in several ways. First, the auto-throttle inner loop control algorithm provides throttle rate control, also referred to as delta-throttle commands that can translate acceleration guidance/commands into an equivalent throttle movement and control the throttle, or a servo driving the throttle, accordingly. Next, the auto-throttle inner loop control algorithm compensates for flight path changes, turns and configuration changes; and does so, specifically, without needing accurate drag readings, which are not available on all aircraft. The throttle rate control module 104 compensates for engines that have nonlinear throttle (throttle level angle, TLA) versus thrust (T) regions by modifying its delta-throttle commands in nonlinear regions. Additionally, the throttle rate control module 104 provides improved performance when utilized in fully-coupled systems, by using the autoflight or flight director commands to provide immediate compensation of aircraft attitude changes while managing the target acceleration. Finally, the provided auto-throttle inner loop control algorithm can be implemented as a standalone flight path acceleration controller by decoupling an auto-thrust or thrust director guidance by a direct input from a physical inceptor controlled by the pilot.

In the described embodiments, the auto-throttle inner loop control algorithm is applied in the context of a Primary Flight Display (PFD) providing legacy flight path vector and legacy Flight Path Angle (FPA) Symbols. Although the auto-throttle inner loop control algorithm is generally realized as an enhanced throttle control system within an aircraft, the concepts presented here can be deployed in a variety of mobile platforms, such as rotorcraft, spacecraft, and the like. Additionally, the provided system and method may be separate from, or integrated within, a preexisting mobile platform management system, electronic flight information system (EFIS) or aircraft flight control system (AFCS).

Figure 1:
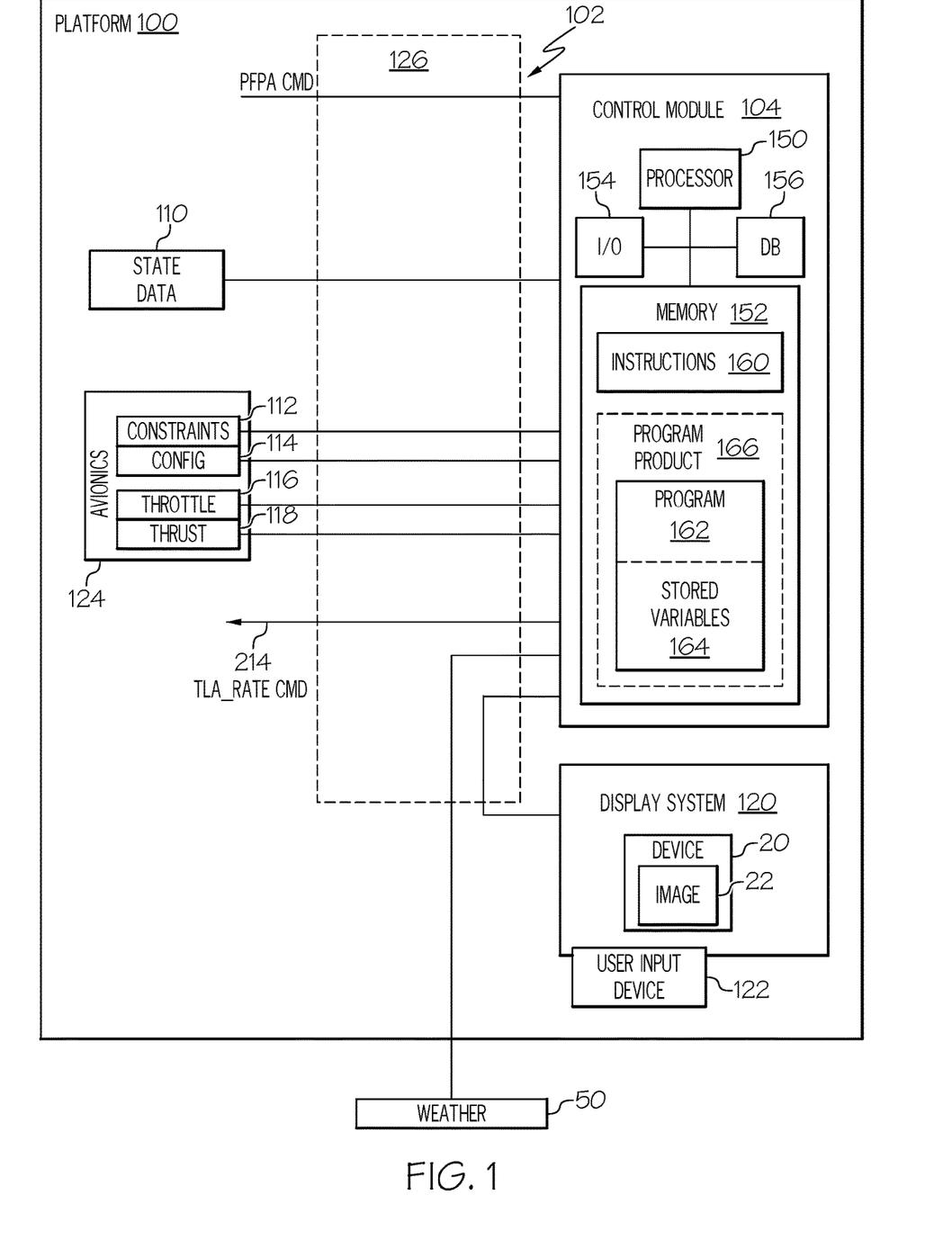
FIG. 1 is a block diagram of a system providing throttle rate control, in accordance with an exemplary embodiment.

Turning now to FIG. 1, in an embodiment, a flight guidance system employing the throttle rate control system 102 (also referred to herein as "system" 102) is generally associated with a mobile platform 100. In various embodiments, the mobile platform 100 is an aircraft, and is referred to as aircraft 100. The system 102 embodies the control module 104. Although the control module 104 is shown as an independent functional block, onboard the aircraft 100, in some embodiments, the control module 104 is integrated within a preexisting mobile platform management system, avionics system, cockpit display system (CDS), flight controls system (FCS), or aircraft flight management system (FMS). In some embodiments, the control module 104, user input device 122, and display system 120 are configured as a control display unit (CDU). In other embodiments, the control module 104 may exist in an electronic flight bag (EFB) or portable electronic device (PED), such as a tablet, cellular phone, or the like. In embodiments in which the control module is within an EFB or a PED, the display system 120 and user input device 122 may also be part of the EFB or PED.

At its broadest level, the control module 104 may receive a potential flight path acceleration ($PFPA_{cmd}$) target and generate therefrom delta-throttle control commands, referred to as "throttle level angle rate commands" ($TLA\_rate_{cmd}$). In various embodiments, the control module 104 may be operationally coupled to any combination of the following aircraft systems, which are generally on-board systems: a source of a potential flight path angle acceleration ($PFPA_{cmd}$); a source of real time (RT) aircraft state data 110; a source of aircraft constraints 112; a source of aircraft configuration data 114, including sensor information and pre-programmed information (equipment settings and weight); a source of a throttle 116 setting; a source of a thrust level 118 setting; a display system 120; and, a user input device 122. In various embodiments, a communication system and fabric 126 may reside onboard and serve to communicatively couple various on-board systems and external sources, such as a source of weather data 50, to the control module 104. The functions of these aircraft systems, and their interaction, are described in more detail below.

In various embodiments, the potential flight path acceleration ($PFPA_{cmd}$) target may be manually provided via a user input device 122 called an acceleration inceptor, which is a throttle-like unit configured as an acceleration interface. In other embodiments, the potential flight path acceleration ($PFPA_{cmd}$) target may be provided by a thrust director module (as described in a co-pending application) or other source of acceleration commands, such as a flight management system (FMS), in communication with a navigation database another software program or algorithm, as described in more detail below.

Real time (RT) aircraft state data generally refers to navigation system data and inertial data. In some embodiments, the source of RT aircraft state data 110 may be a navigation system, and aircraft state data is sometimes referred to as navigation data. As used herein, "real-time" is interchangeable with current, instantaneous, and actual (as opposed to intended). RT aircraft state data may include any of: an instantaneous location (e.g., the latitude, longitude, orientation, attitude), an instantaneous track (i.e., the direction the aircraft is traveling in relative to some reference), a RT flight path angle, a RT vertical speed, a RT ground speed, a RT instantaneous altitude (or height above ground level), and a current phase of flight of the aircraft 100. In various embodiments, the source of aircraft state data 110 may include each of: an aircraft data system (ADS), a global positioning system (GPS), inertial reference system (IRS), or a radio-based navigation system (e.g., VHF omni-directional radio range (VOR) or long-range aid to navigation (LORAN)), and may include one or more navigational radios or other sensors suitably configured to support operation of the FMS, as will be appreciated in the art. In various embodiments, the RT aircraft state data is made available by way of the communication system and fabric 126, so other components, such as the control module 104 and the display system 120, may further process and/or handle the aircraft state data.

Avionics 124 data generally includes data that is specific to components and systems of aircraft 100, such as may be provided by sensors and/or equipment specifications. In an embodiment, avionics status data may be organized as constraints 112, configurations 114, throttle 116, and thrust 118. In an embodiment, constraints 112 may include a pre-programmed starting weight for the aircraft 100. In an embodiment, constraints 112 may control onboard systems to provide comfort during flight. In an embodiment, constraints 112 may include look up tables; in an embodiment, constraints 112 may further include an aircraft/engine-specific pre-programmed information, such as, look up table defining the constraints on the relationship between an engine thrust (T) level for each throttle level angle (TLA) setting/position, from a minimum TLA to a maximum TLA. Persons with skill in the art are aware that an engine-specific T vs. TLA relationship is generally non-linear. For example, with reference to FIG. 3, it can be observed that at the lowest TLA 302, there is an associated minimum thrust, $T_{idle}$ 304, and the T is fairly flat as TLA increases to TLA 306. From TLA 306 to TLA 308, there is a steeper and more nearly linear positive relationship between TLA and engine thrust, T. After TLA 308, the T flattens again, approaching a maximum ($T_{max}$) as TLA continues to increase to its maximum. A delta TLA in the range between TLA 302 and TLA 306 has a small delta T, whereas the same sized delta TLA in the range between TLA 306 and TLA 308 will have a substantially larger delta T. As can be appreciated, the T versus TLA graph 300 will vary for different aircraft and engines.

Configurations 114 may represent current (real-time) sensed component and system information and/or status for each of various on-board avionics systems; specific to this disclosure, RT aircraft configuration data collectively includes a current weight (W), status of aircraft flaps, landing gear position, status of spoilers, status of air brakes, status of flaps, etc.

Although RT throttle and RT thrust may be considered part of configurations 114, for the examples herein, we separate them out. Throttle 116 settings provides a current (real-time) sensed throttle level angle (TLA) setting. Thrust 118 settings provides a current (real-time) sensed thrust (T) level, generally in a range from idle to maximum. There may be a delay in time between a RT change in a TLA and a RT T response thereto, i.e., the RT T reaching the constraints T for the TLA. Also, as mentioned in connection with FIG. 2, there's a relationship between T and TLA, but it may be not linear.

During operation, the components of avionics status data self-report or provide respective real-time (RT) performance data and sensed data for further processing. Therefore, at least the thrust (T) level, weight (W), and throttle level angle (TLA) setting, are continually updated for further processing.

A source of weather data 50 provides current weather conditions. Some weather conditions, such as wind, effect airspeed, and are utilized by the control module 104 in the generation of the $TLA\_rate_{cmd}$.

In various embodiments, communication between aircraft 100 subsystems is managed by a communication system and fabric 126. The communication system and fabric 126 is configured to support instantaneous (i.e., real time or current) communications between onboard systems (i.e., the navigation system, the navigation database, the various avionics systems, the FMS), the control module 104, and one or more external data source(s) 122. As a functional block, the communication system and fabric 126 may represent one or more transmitters, receivers, and the supporting communications hardware and software required for components of the system 102 to communicate as described herein. In various embodiments, the communication system and fabric 126 may have additional communications not directly relied upon herein, such as bidirectional pilot-to-ATC (air traffic control) communications via a datalink; support for an automatic dependent surveillance broadcast system (ADS-B); a communication management function (CMF) uplink; a terminal wireless local area network (LAN) unit (TWLU); an instrument landing system (ILS); and, any other suitable radio communication system that supports communications between the aircraft 100 and the various external source(s). In various embodiments, the control module 104 and communication system and fabric 126 also support controller pilot data link communications (CPDLC), such as through an aircraft communication addressing and reporting system (ACARS) router; in various embodiments, this feature may be referred to as a communications management unit (CMU) or communications management function (CMF). In summary, the communication system and fabric 126 may allow the aircraft 100 and the control module 104 to receive information that would otherwise be unavailable to the pilot and/or co-pilot using only the onboard systems.

The user input device 122 and the control module 104 are cooperatively configured to allow a user (e.g., a pilot, co-pilot, or crew member) to interact with display devices 20 in the display system 120 and/or other elements of the system 102, as described in greater detail below. Depending on the embodiment, the user input device 122 may be realized as a cursor control device (CCD), keypad, touchpad, keyboard, mouse, touch panel (or touchscreen), joystick, knob, line select key, voice controller, gesture controller, or another suitable device adapted to receive input from a user. When the user input device 122 is configured as a touchpad or touchscreen, it may be integrated with the display system 120. As used herein, the user input device 122 may be used to modify or upload the program product 166, override the program when it's running, etc. In various embodiments, the display system 120 and user input device 122 are onboard the aircraft 100 and are also operationally coupled to the communication system and fabric 126.

In various embodiments, the control module 104, alone, or as part of a central management computer (CMS) or a flight management system (FMS), loads instructions 160 to thereby be programmed with instructions 160. The control module executes instructions 160 and thereby draws upon input data and information to provide real-time flight guidance for aircraft 100. The real time flight guidance may be provided to a user by way of graphics and commands for the display system 120, an audio system, or the like. For example, the control module 104 may compare an instantaneous (current) position and heading of the aircraft 100 with the prescribed or intended flight plan data for the aircraft 100 and generate display commands to render images 22 distinguishing these features. The control module 104 may further associate a respective airport, its geographic location, runways (and their respective orientations and/or directions), instrument procedures (e.g., approach procedures, arrival routes and procedures, takeoff procedures, and the like), airspace restrictions, and/or other information or attributes associated with the respective airport (e.g., widths and/or weight limits of taxi paths, the type of surface of the runways or taxi path, and the like) with the instantaneous position and heading of the aircraft 100 and/or with the weather data 50.

The control module 104 generates throttle control commands (TLA_rate$_{cmd}$) to thereby control the throttle 116 in an avionics system. In various embodiments, the control module 104 is also used in conjunction with the user interface 122 to allow a user to adjust parameters and display various intermediate determinations. When causing a display of information, the control module 104 generates display commands for the display system 120 to cause the display device 20 to render thereon the image 22, comprising various graphical user interface elements, tables, icons, alerts, menus, buttons, and pictorial images, as described herein. The display system 120 is configured to continuously receive and process the display commands from the control module 104. The display system 120 includes a display device 20 for presenting an image 22. In various embodiments described herein, the display system 120 includes a synthetic vision system (SVS), and the image 22 is an SVS image. In exemplary embodiments, the display device 20 is realized on one or more electronic display devices configured as any combination of: a head up display (HUD), an alphanumeric display, a vertical situation display (VSD) and a lateral navigation display (ND).

The control module 104 performs the functions of the system 102. As used herein, the term "module" refers to any means for facilitating communications and/or interaction between the elements of the system 102 and performing additional processes, tasks and/or functions to support operation of the system 102, as described herein. In various embodiments, the control module 104 may be any hardware, software, firmware, electronic control component, processing logic, and/or processor device, individually or in any combination. Depending on the embodiment, the control module 104 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Accordingly, in FIG. 1, an embodiment of the control module 104 is depicted as an enhanced computer system including a processor 150 and a memory 152. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 152 may comprise RAM memory, ROM memory, flash memory, registers, a hard disk, or another suitable non-transitory short or long-term storage media capable of storing computer-executable programming instructions or other data for execution. The memory 152 may be located on and/or co-located on the same computer chip as the processor 150. Generally, the memory 152 maintains data bits and may be utilized by the processor 150 as storage and/or a scratch pad during operation. Information in the memory 152 may be organized and/or imported from an external data source during an initialization step of a process; it may also be programmed via a user input device 122. In some embodiments, the database 156 is part of the memory 152. In some embodiments, the instructions 160, program 162, and stored variables 164 are pre-loaded into the memory 152 or the database 156, and are, therefore, internal to the control module 104.

The program 162 includes previously described auto-throttle inner loop control algorithm, comprising rules and instructions which, when executed, convert the processor 150/memory 152/database 156 configuration into the control module 104 that performs the functions, techniques, and processing tasks attributed to the operation of the system 102. Novel program 162 and associated stored variables 164 may be stored in a functional form on computer readable media, for example, as depicted, in memory 152. While the depicted exemplary embodiment is described in the context of a fully functioning computer system, those skilled in the art will recognize that the mechanisms of the present disclosure are capable of being distributed as a program product 166. As a program product 166, one or more types of non-transitory computer-readable signal bearing media may be used to store and distribute the program 162, such as a non-transitory computer readable medium bearing the program 162 and containing therein additional computer instructions for causing a computer processor (such as the processor 150) to load and execute the program 162. Such a program product 166 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

In various embodiments, the processor/memory unit of the control module 104 may be communicatively coupled (via a bus 155) to an input/output (I/O) interface 154, and a database 156. The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The I/O interface 154 enables intra control module 104 communication, as well as communications between the control module 104 and other system 102 components, and between the control module 104 and the external data sources via the communication system and fabric 126. The I/O interface 154 may include one or more network interfaces and can be implemented using any suitable method and apparatus. In various embodiments, the I/O interface 154 is configured to support communication from an external system driver and/or another computer system. In one embodiment, the I/O interface 154 is integrated with the communication system and fabric 126 and obtains data from external data source(s) directly. Also, in various embodiments, the I/O interface 154 may support communication with technicians, and/or one or more storage interfaces for direct connection to storage apparatuses, such as the database 156.

As mentioned, Primary Flight Displays (PFDs) promote easy recognition of whether the aircraft is climbing or descending. When an FPA cue position is above the horizon, the aircraft is climbing, and when the FPA cue position is below the horizon, the aircraft is descending. The addition of a Potential Flight Path Angle (PFPA) cue to the PFD, as disclosed in Wyatt, et al, U.S. patent application Publication Ser. No. 15/700,416, "AUTOMATIC FLIGHT CONTROL SYSTEMS AND METHODS") has improved a pilot's recognition of the aircraft's current energy state. A PFPA cue above/below the FPA cue indicates that the aircraft is accelerating/decelerating along its current flight path or trajectory.

During operation, the processor 150 loads and executes one or more programs, algorithms and rules embodied as instructions and applications 160 contained within the memory 152 and, as such, controls the general operation of the control module 104 as well as the system 102. With specific reference to the processes and tasks described herein, the processor 150 loads the program 162, thereby being uniquely programmed with the novel auto-throttle inner loop control algorithm. Moving now to FIG. 2, and with continuing reference to FIG. 1, operation and performance of the system 102 are described.

A Potential Flight Path Angle (PFPA) represents the flight path angle that could be maintained at the current airspeed. It can be defined, using small angle approximation, as shown in Eq. 1, below:

$$PFPA = FPA + \left(\frac{180}{\pi}\right)\frac{a_{FPA}}{g} \quad (1)$$

Where FPA is the Flight Path Angle of the aircraft, $a_{FPA}$ is the acceleration/deceleration along the flight path trajectory (also referred to as a flight path vector), and g is the acceleration due to gravity. Since the difference between the PFPA and the aircraft's fight path angle (FPA) represents current acceleration/deceleration, the difference between the PFPA and the aircraft's fight path angle (FPA) is an indicator that provides a simple frame of reference to the pilot to manually control the aircraft's airspeed or move the aircraft to a desired airspeed at a predetermined acceleration/deceleration.

The increased use of flight path acceleration cues, like the PFPA, to manually control speed on aircraft has made way to guidance cues that provide thrust and speed control commands on this axis of control. Embodiments of an enhanced flight guidance system providing thrust guidance (such as co-submitted provisional application, "SYSTEMS AND METHODS FOR PROVIDING THRUST GUIDANCE RELATED TO FLIGHT PATH ANGLE"), provide a similar role to aircraft having auto-flight functions, by providing an outer loop control function of the overall auto-pilot system. As specifically mentioned in the co-submitted provisional application, when the thrust director cue is used to provide potential flight path acceleration targets (PFPA$_{cmds}$) as an outer loop control function to an overall auto-throttle 116 system, it may be desirable to employ an inner loop auto-throttle to manage the control of the throttle 116 to achieve the flight path acceleration targets PFPA$_{cmds}$ embodied in the thrust director cue. Exemplary embodiments of solution to this technical problem are provided, in which an auto-throttle inner loop control algorithm receives the flight path acceleration targets and generates delta-throttle controls therefrom. As described below, the proposed auto-throttle inner loop control algorithm only requires proper conversion of a target acceleration or target speed at the flight path angle to an equivalent flight path acceleration.

Figure 2:
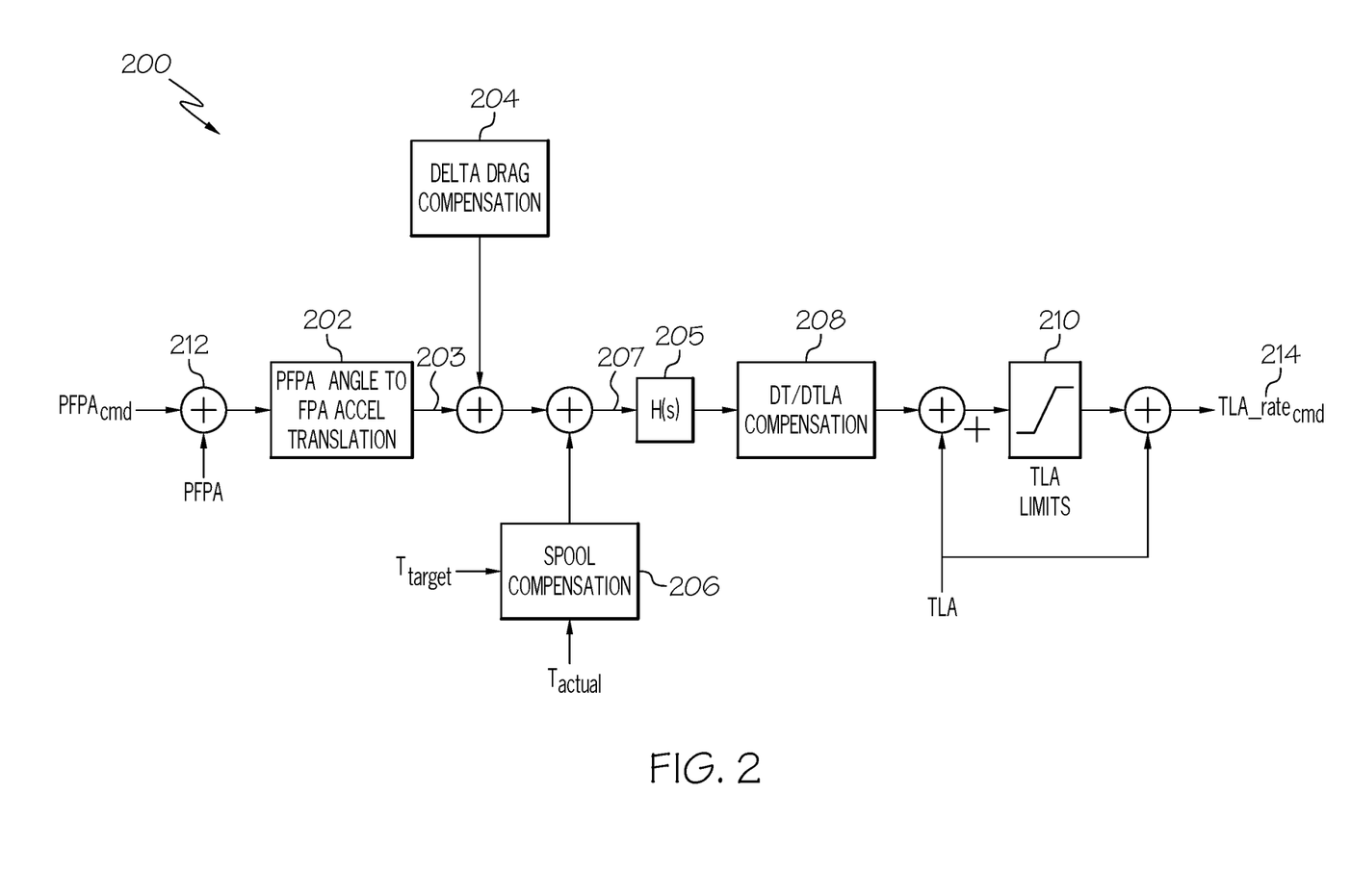
FIG. 2 is a data flow diagram for an auto-throttle inner loop control, in accordance with an exemplary embodiment.

In FIG. 2, the data flow diagram 200 for the proposed inner loop auto-throttle control algorithm is shown. In an embodiment, it receives an input that is acceleration. The input engine power target thrust acceleration command, PFPA$_{cmd}$, is defined as a function of a flight path acceleration (FPA). As mentioned, the source of the PFPA$_{cmd}$ may be either an outer loop controller that tracks speed or thrust, or a manual interface to the pilot. Operator 212 generates an angle output, which is an error on a potential flight path angle (PFPA) using the target thrust acceleration command, PFPA$_{cmd}$ and the aircraft potential flight path angle (PFPA). The error on the potential flight path angle is an input into process 202.

Process 202 is essentially a unit converter. Process 202 translates the angle into equivalent acceleration; i.e., PFPA angle to flight path angle acceleration, denoted FPA acceleration 203. Translation at process 202 uses Eq. 1, solves for $a_{FPA}$. The control law algorithm embodied in the data flow diagram 200 converts $a_{FPA}$ into a desired delta-throttle command, denoted throttle rate TLA_rate$_{cmd}$ 214.

Maintaining a target flight path acceleration by adjusting a current throttle level angle (TLA), as only a function of flight path acceleration error (i.e., at 203), as available solutions often attempt, can result in an inner loop auto-throttle response that is just reactionary, and not capable of anticipating throttle adjustments during maneuvers, configuration changes, engine spool effects or non-linearities of the throttle-to-engine response. The technical solution provided by the inner loop auto-throttle control algorithm advantageously employs several compensation processes to adjust FPA acceleration 203 in the creation of the desired TLA_rate$_{cmd}$ 214.

When a turn is initiated or when the aircraft configuration is changed, the drag of the aircraft is affected, thus requiring adjustment to the thrust (T) being applied to maintain the flight path acceleration (FPA). Accordingly, the delta drag compensation process 204 estimates the amount of delta drag that will occur when either the aircraft configuration changes, and during a maneuver on another axis (i.e. roll, flight path). The delta drag compensation process 204 uses inputs such as the real time settings for flaps, gear handles, and the Flight Director Commands (when applicable), and responsive thereto, adds an additional acceleration request (first adjustment) to the FPA acceleration 203 to offset/cancel the impact of the configuration changes and/or maneuvers, and minimize the potential of a transient on the desired potential flight path.

The engine spool has the effect of causing undesired overshoots/undershoots in the capture of a potential flight path target due to the delayed response of the thrust (T) acceleration to a throttle level angle (TLA) change, this is also referred to as the spool effect. The Spool Compensation process 206 monitors the difference between the actual thrust (T$_{actual}$) and steady state thrust that the engine is promising based on the constraint data (T$_{target}$) to enable the control module 104 to add an additional acceleration request (second adjustment) to the FPA acceleration 203 to offset/cancel the spool effect. In an embodiment, the spool compensation process 206 may employ a spool threshold, and when a magnitude of the difference between $T_{actual}$ and $T_{target}$ exceeds the spool threshold, the second adjustment is a threshold compensation term. In an embodiment, the spool compensation process 206 may employ a spool function that modifies the magnitude of the difference between $T_{actual}$ and $T_{target}$, and the second adjustment is a function compensation term, being a function of the magnitude of the difference between $T_{actual}$ and $T_{target}$, modified by the spool function.

Process 205 receives input 207, which is the FPA acceleration 203 that has been adjusted with the first adjustment and second adjustment. Process 205 references aircraft constraints 112 for aircraft performance data and performs acceleration limiting on input 207. The output from process 205 is then normalized at process 208.

Most Engines exhibit a non-linear relationship between Thrust (T) and throttle level angle. As a result, a delta TLA in a first part of a TLA travel window and the same delta TLA in a second part of the TLA travel window can result in two different delta Ts. The Delta Thrust to Delta TLA compensation process 208 and the TLA limiting process 210 utilize an engine-specific TLA versus T data to linearize this relationship across the entire TLA window. Accordingly, as part of the technical solution provided by the system 102, process 208 and process 210 allow the inner loop auto-throttle control algorithm to normalize the equivalent acceleration command (after it has been subject to the first adjustment and the second adjustment) based on the throttle location (e.g., the actual servo throttle location).

On commonly available auto-throttles, limiting the throttle positions to the allowed engine ratings is done during an engine-power command to throttle command translation. In the solution provided by the system 102, the engine-power (i.e., T limits) is either converted directly into equivalent TLA positions or by modulating a difference between engine-power and throttle rating to generate the throttle rate command, $TLA\_rate_{cmd}$.

Notice that the control algorithm embodied in the data flow diagram 200 remains the same for embodiments that receive an input acceleration/deceleration $a_{FPA}$ target (by removing the PFPA to FPA Acceleration translation process 202) and for embodiments that receive an input speed rate target (by modifying the PFPA to FPA Accel translation process 202 to a Vdot to FPA Acceleration translation), as the core inner loop control law only requires proper conversion of the target to equivalent flight path acceleration.

Figure 3:
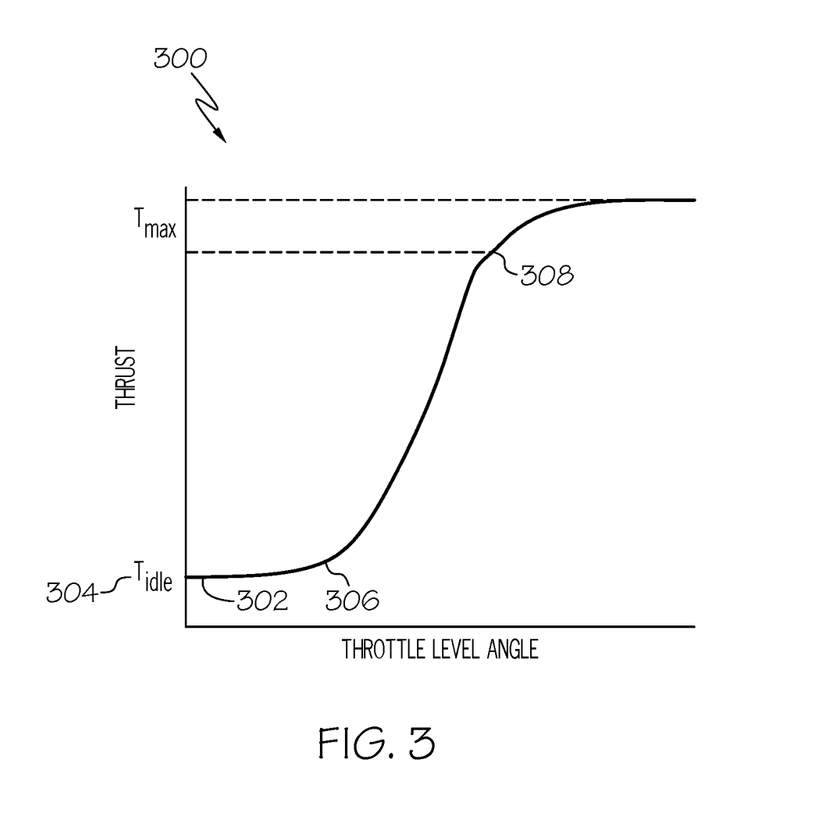
FIG. 3 is a graphical depiction of a thrust versus throttle relationship, in accordance with an exemplary embodiment.
Figure 4:
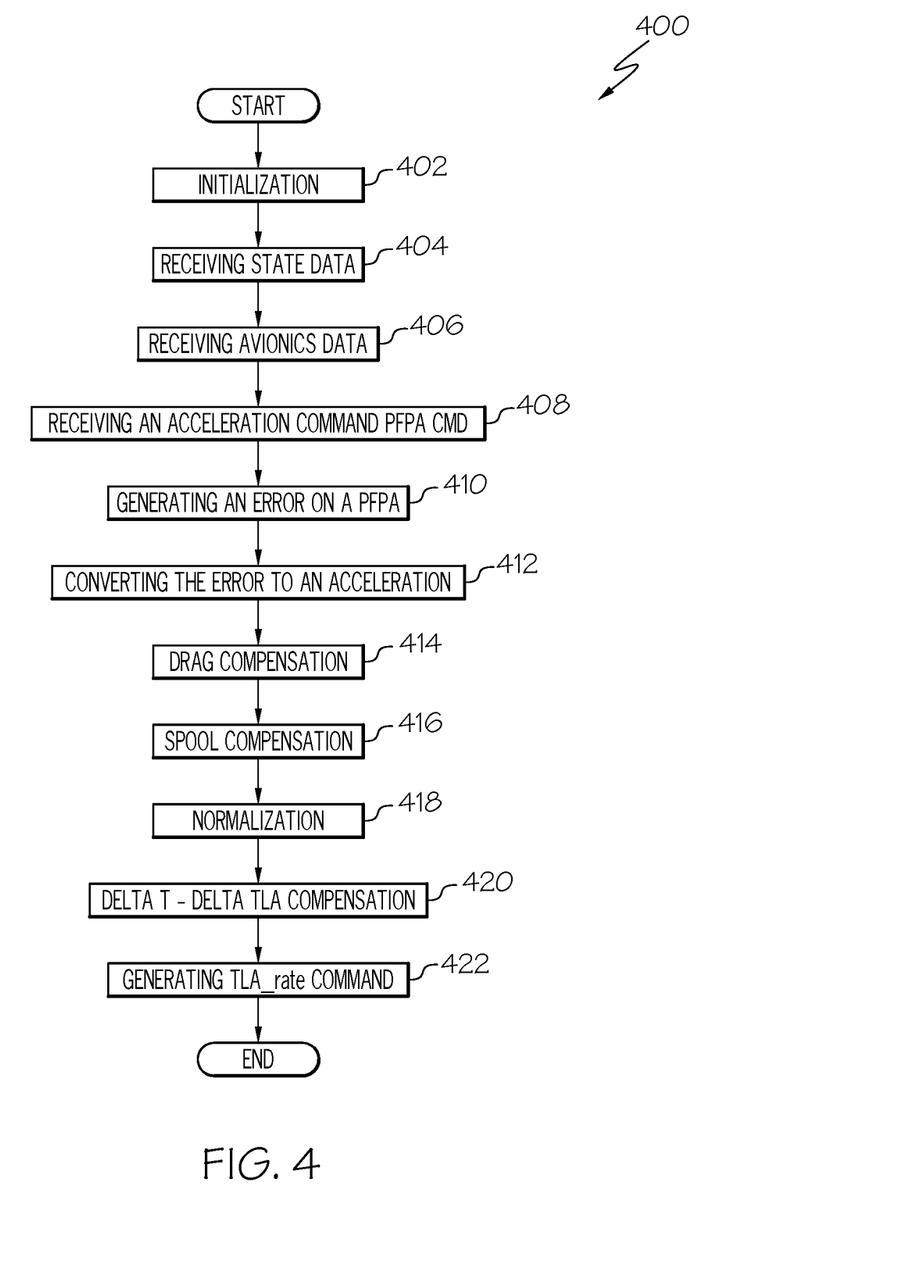
FIG. 4 is a method for providing throttle rate control, in accordance with an exemplary embodiment.

Referring now to FIG. 4 and with continued reference to FIGS. 1-3, a flow chart is provided for a method 400 for providing throttle rate control, in accordance with various exemplary embodiments. For illustrative purposes, the following description of method 400 may refer to elements mentioned above in connection with FIGS. 1-3. In practice, portions of method 400 may be performed by different components of the described system. It should be appreciated that method 400 may include any number of additional or alternative tasks, the tasks shown in FIG. 4 need not be performed in the illustrated order, and method 400 may be incorporated into a more comprehensive procedure or method having additional functionality not described in detail herein. Moreover, one or more of the tasks shown in FIG. 4 could be omitted from an embodiment of the method 400 if the intended overall functionality remains intact.

The method starts, and at 402 the control module 104 is initialized. As mentioned above, initialization may comprise uploading or updating instructions and applications 160, program 162, stored variables 164, such as the T vs TLA look-up tables, and the like. Initialization at 402 may also include identifying weather information sources 50 and/or external signals and the communication protocols to use with each of them.

At 402 State data is received, and at 404 avionics data is received. As mentioned, avionics data may include thrust and throttle information, as well as aircraft-specific constraints and sensed configuration information. Data received at 402 and 404 may be used to generate the PFPA input to operator 212. At 408, an acceleration command, such as $PFPA_{CMD}$, may be received. At 410, operator 212 outputs an error on the PFPA that is in angular form, and at 412, the method 400 converts the error into an FPA acceleration 203.

At 414, the delta drag compensation process 204 may perform a first adjustment on the FPA acceleration 203 and at 416, the Spool compensation process 206 may perform a second adjustment on the FPA acceleration 203. At 418, process 205 performs a normalization on the input 207, which is the FPA acceleration 203 that has been adjusted with the first adjustment and second adjustment. At 420, delta T vs delta TLA compensation is performed by process 208. At 422, the $TLA\_rate_{CMD}$ is generated.

Accordingly, the exemplary embodiments discussed above provide a method for implementing a novel auto-throttle inner loop control algorithm. The novel auto-throttle inner loop control algorithm extends capabilities of vehicle control systems to automatically implement delta-throttle changes which can directly, and without further human manipulation, control an auto-throttle system to achieve acceleration targets, such as $PFPA_{cmds}$.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A processor-implemented method for providing throttle rate control, comprising:
   receiving aircraft constraints;
   receiving a potential flight path angle command, $PFPA_{cmd}$, which is a function of a flight path acceleration;
   receiving a throttle level angle (TLA), which is a real time (RT) throttle setting;
   receiving a RT thrust (T) setting;
   using the potential flight path angle command, $PFPA_{cmd}$ to generate an error on a potential flight path angle;
   converting the error on the potential flight path angle into an equivalent flight path acceleration;
   generating a throttle rate command $TLA\_rate_{cmd}$ by converting the equivalent flight path acceleration into the throttle rate command $TLA\_rate_{cmd}$;
   detecting a change in real time settings for one or more of flaps, gear handles, bank angle, and flight director commands;
   estimating a delta drag as a function of the change;

determining a first adjustment to acceleration required to compensate for the delta drag, responsive to estimating the delta drag; and generating the throttle rate command $TLA\_rate_{cmd}$ by further adding the first adjustment to the equivalent flight path acceleration.

2. The processor-implemented method of claim 1, further comprising:

monitoring a difference between RT thrust ($T_{actual}$) and a target thrust ($T_{target}$);

determining a second adjustment to acceleration that is a function of the difference between $T_{actual}$ and $T_{target}$; and generating the throttle rate command $TLA\_rate_{cmd}$ by further adding the second adjustment to the equivalent flight path acceleration.

3. The processor-implemented method of claim 2, further comprising:

employing a spool function that modifies a magnitude of the difference between $T_{actual}$ and $T_{target}$; and wherein the second adjustment is a function of the magnitude of the difference between $T_{actual}$ and $T_{target}$, modified by the spool function.

4. The processor-implemented method of claim 2, further comprising:

employing a spool threshold; and wherein, when a magnitude of the difference between $T_{actual}$ and $T_{target}$ exceeds the spool threshold, the second adjustment is a threshold compensation term.

5. The processor-implemented method of claim 3, further comprising:

generating the throttle rate command $TLA\_rate_{cmd}$ by referencing engine-specific TLA versus T data to normalize the equivalent flight path acceleration command.

6. The processor-implemented method of claim 4, further comprising:

generating the throttle rate command $TLA\_rate_{cmd}$ by referencing engine-specific TLA versus T data to normalize the equivalent flight path acceleration command.

7. A system for providing throttle rate control, comprising:

a source of aircraft state data;
a source of aircraft constraints;
a source of a potential flight path angle command, $PFPA_{cmd}$, which is a function of a flight path acceleration;
a source of a real time (RT) throttle level angle (TLA) that is a throttle setting;
a source of a RT thrust (T) setting;
a processor operationally coupled to the source of aircraft constraints, the source of a thrust acceleration command, the source of a RT TLA, and the source of a RT T, the processor programmed to:
use the potential flight path angle command, $PFPA_{cmd}$ to generate an error on a potential flight path angle;
convert the error on the potential flight path angle into an equivalent flight path acceleration;
generate a throttle rate command $TLA\_rate_{cmd}$ by converting the equivalent flight path acceleration into the throttle rate command $TLA\_rate_{cmd}$;
detect a change in real time settings for one or more of flaps, gear handles, and flight director commands
estimate a delta drag as a function of the detected change;

determine a first adjustment to acceleration required to compensate for the delta drag, responsive to estimating the delta drag; and generate the throttle rate command $TLA\_rate_{cmd}$ by further adding the first adjustment to the equivalent flight path acceleration.

8. The system of claim 7, wherein the processor is further programmed to:

monitor a difference between RT thrust ($T_{actual}$) and target thrust ($T_{target}$);

determine a second adjustment to acceleration that is a function of the difference between $T_{actual}$ and $T_{target}$; and generate the throttle rate command $TLA\_rate_{cmd}$ by further adding the second adjustment to the equivalent flight path acceleration.

9. The system of claim 8, wherein the processor is further programmed to:

employ a spool function that modifies a magnitude of the difference between $T_{actual}$ and $T_{target}$; and wherein the second adjustment is a function of the magnitude of the difference between $T_{actual}$ and $T_{target}$, modified by the spool function.

10. The system of claim 8, wherein the processor is further programmed to:

employ a spool threshold; and wherein, when a magnitude of the difference between $T_{actual}$ and $T_{target}$ exceeds the spool threshold, the second adjustment is a threshold compensation term.

11. The system of claim 9, wherein the processor is further programmed to:

reference engine-specific TLA versus T data to normalize the equivalent flight path acceleration command.

12. The system of claim 10, wherein the processor is further programmed to:

referencing engine-specific TLA versus T data to normalize the equivalent flight path acceleration command.

13. An aircraft, comprising:

a source of aircraft state data;
a source of aircraft constraints;
a source of a potential flight path angle command, $PFPA_{cmd}$, which is a function of a flight path acceleration;
a source of a real time (RT) throttle level angle (TLA);
a source of a RT thrust (T) setting;
a processor operationally coupled to the source of aircraft constraints, the source of a thrust acceleration command, the source of a RT TLA, and the source of a RT T, the processor programmed to:
use the potential flight path angle command, $PFPA_{cmd}$ to generate an error on a potential flight path angle;
convert the error on the potential flight path angle into an equivalent flight path acceleration;
generate a throttle rate command $TLA\_rate_{cmd}$ by converting the equivalent flight path acceleration into the throttle rate command $TLA\_rate_{cmd}$;
detect a change in real time settings for one or more of flaps, gear handles, and flight director commands;
estimate a delta drag as a function of the detected change;
determine a first adjustment to acceleration required to compensate for the delta drag, responsive to estimating the delta drag; and
generate the throttle rate command $TLA\_rate_{cmd}$ by further adding the first adjustment to the equivalent flight path acceleration.

14. The aircraft of claim 13, wherein the processor is further programmed to:
- monitor a difference between RT thrust ($T_{actual}$) and target thrust ($T_{target}$);
- determine a second adjustment to acceleration that is a function of the difference between $T_{actual}$ and $T_{target}$; and
- generate the throttle rate command $TLA\_rate_{cmd}$ by further adding the second adjustment to the equivalent flight path acceleration.

15. The aircraft of claim 14, wherein the processor is further programmed to:
- employ a spool function that modifies a magnitude of the difference between $T_{actual}$ and $T_{target}$; and
- wherein the second adjustment is a function compensation term.

16. The aircraft of claim 15, wherein the processor is further programmed to:
- employ a spool threshold; and
- wherein, when a magnitude of the difference between $T_{actual}$ and $T_{target}$ exceeds the spool threshold, the second adjustment is a threshold compensation term.

17. The aircraft of claim 16, wherein the processor is further programmed to:
- reference engine-specific TLA versus T data to normalize the equivalent flight path acceleration command.

* * * * *